(No Model.)

J. McLAUGHLIN.
RUNNING GEAR FOR VEHICLES.

No. 275,400. Patented Apr. 10, 1883.

WITNESSES
Samuel E. Thomas
J. Edward Warren

INVENTOR
James McLaughlin
By W. W. Loggett,
Attorney

UNITED STATES PATENT OFFICE.

JAMES McLAUGHLIN, OF OVID, MICHIGAN.

RUNNING-GEAR FOR VEHICLES.

SPECIFICATION forming part of Letters Patent No. 275,400, dated April 10, 1883.

Application filed August 29, 1882. (No model.)

*To all whom it may concern:*

Be it known that I, JAMES McLAUGHLIN, of Ovid, county of Clinton, and State of Michigan, have invented a new and useful Improvement in Carriage and Wagon Gears; and I declare the following to be a full, clear, and exact description of the same, such as will enable others skilled in the art to which it pertains to make and use it, reference being had to the accompanying drawings, which form a part of this specification.

My invention consists in the combinations of devices and appliances hereinafter specified, and more particularly pointed out in the claim.

Figure 1:
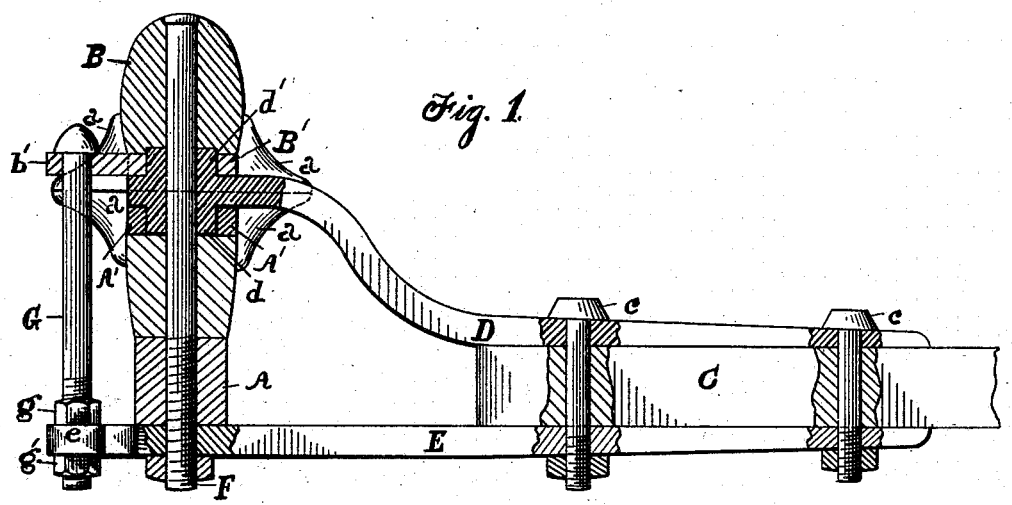
Figure 2:
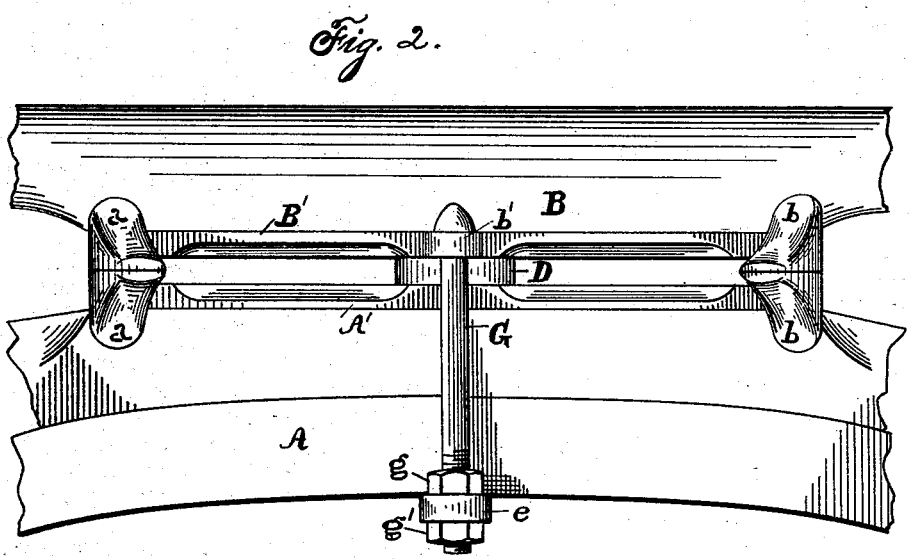

In the drawings, Figure 1 is a longitudinal section of an apparatus embodying my invention. Fig. 2 is a front elevation.

The object of my invention is to provide a top front perch-stay for fifth-wheel and drop-reach gear which will not require to be bolted through the head-block.

In carrying out my invention, A is the axle. A' is the bed-plate, attached to the axle. B is the head-block. B' is the top plate, secured to the head-block. *a* and *b* represent the circles. C is the reach. D is the top front perch-stay. E is the under stay-iron. F is the king-bolt.

The plate B' and the stay-iron E are preferably constructed with suitable outstanding bolt-sockets, b' and e.

G is a bolt seated in the sockets b' and e, whereby the head-block and the axle are adjustably secured together. Said bolt is provided with an upper nut, g, and a lower nut, g'. It is evident that when the circles wear off in any measure, by loosening the nut g and tightening the nut g' the head-block and axle may be tightened as desired.

c represents bolts which fasten the top front perch-stay, D, and the under stay-iron, E, to the reach. The top front perch-stay I construct as shown in the drawings, curved at the forward end and constructed with a socket for the passage of the king-bolt. This socket is formed or provided on both its upper and lower ends with a sleeve projection to form annular flanges d d', which constitute top and bottom circular hub-bearings, which are seated in corresponding sockets in the bed-plate A' and the top plate, B'. It is evident that by the use of a top front perch-stay so constructed and so secured in the sockets in the bed-plates the necessity of securing it to the head-block by bolts is avoided, and also the strain is taken off the king-bolt.

It will also be seen that my device affords a very neat construction for gears of the class mentioned, and that it may be used for either end-spring or side-bar vehicles.

With a gear so constructed there is but little friction at the contact-points of the circles and of the flanges of the perch-stay socket.

It is obvious that this top front perch-stay may be easily constructed, either of wrought or of malleable iron or metal.

I am aware that a fifth-wheel has been composed of two plates, the lower one of which has a pivotal boss entering a corresponding aperture in the upper plate; but such is not my invention.

What I claim is—

In a carriage or wagon gear, the top front perch-stay constructed with a socket for the passage of the king-bolt, said socket being provided on its upper and lower sides with sleeve projections in the form of annular flanges, constituting circular hub-bearings, in combination with the axle having a bed-plate, and the head-block having a top plate, said bed and top plates having annular sockets into which project the annular flanges on the perch-stay, substantially as described.

In testimony whereof I sign this specification in the presence of two witnesses.

JAMES McLAUGHLIN.

Witnesses:
W. W. ANDREWS,
J. N. SMITH.